United States Patent [19]

Furuya

[11] 4,192,599
[45] Mar. 11, 1980

[54] SWITCH MECHANISM FOR A MOTOR DRIVEN DEVICE

[75] Inventor: Mikihito Furuya, Kawasaki, Japan
[73] Assignee: Nippon Kogaku K.K., Tokyo, Japan
[21] Appl. No.: 803,263
[22] Filed: Jun. 3, 1977
[30] Foreign Application Priority Data Jun. 18, 1976 [JP] Japan .................................. 51-70968

[51] Int. Cl.² .......................... G03B 1/18; G03B 17/42
[52] U.S. Cl. .................................. 354/173; 200/52 R
[58] Field of Search ............... 354/173, 204, 206, 266, 354/212; 200/52 R, 61.58 R

[56] References Cited

U.S. PATENT DOCUMENTS

| | | | |
|---|---|---|---|
| 3,693,524 | 9/1972 | Furuta | 354/212 |
| 4,030,111 | 6/1977 | Kimura | 354/173 |
| 4,060,818 | 11/1977 | Furuta | 354/173 X |

*Primary Examiner*—James R. Scott
*Attorney, Agent, or Firm*—Shapiro and Shapiro

[57] ABSTRACT

In a camera provided with a motor driven device, a switch is employed for effecting ON-OFF operation of the device, and switch means is operatively associated with the advance lever of the camera and is adapted to assume different positions for the retracted position and the drawn-out position of the advance lever. The switch and the switch means are arranged so that the switch is closed for the retracted position of the advance lever and open for the drawn-out position of the advance lever.

3 Claims, 3 Drawing Figures

SWITCH MECHANISM FOR A MOTOR DRIVEN DEVICE

BACKGROUND OF THE INVENTION

1. Field of the Invention

This invention relates to a switch mechanism for a motor driven device in a camera.

2. Description of the Prior Art

The switch for the conventional motor driven device in a camera has been provided on the side of the device, and is operatively independent of the position of the advance lever of the camera so that the motor drive has taken place for the drawn-out position of the advance lever to thereby cause various inconveniences. For example, the camera body is constructed so that the lever enters the groove of the release shaft in the course of shutter winding to inhibit shutter release. However, if motor drive should occur when the advance lever is in its drawn-out position (but with no winding taking place), and with the shutter button remaining depressed, the lever cannot enter the groove of the release shaft, thereby causing the motor to idle which results in the winding being disabled.

SUMMARY OF THE INVENTION

It is an object of the invention to eliminate the above-noted disadvantages, and to provide a switch mechanism for a motor driven device which prevents the device from assuming the ON position in the course of winding.

A feature of the present invention is that ON-OFF operator of the motor driven device is effected in accordance with the position of the advance lever provided on the camera body.

According to the present invention, the switch mechanism for the motor driven device in a camera comprises a switch for effecting ON-OFF operation of the device, and switch control means is operatively associated with the advance lever of the camera which is adapted to assume different positions for the retracted position and the drawn-out position of the advance lever. The switch and the switch control means are arranged so that the switch is closed for the retracted position of the advance lever and open for the drawn-out position of the advance lever.

The switch mechanism of the present invention may further comprise change-over means extraneously operable for displacement to normal photography position and to motor drive photography position. In this case, the switch and the switch control means are so arranged that when the advance lever is in its drawn-out position, the switch is opened by the switch control means independently of the position of the change-over means, and that when the advance lever is in its retracted position, the change-over means closes the switch in the motor drive photography position and opens the switch in the normal photography position.

The invention will become more fully apparent from the following detailed description thereof taken in conjunction with the accompanying drawings.

DESCRIPTION OF THE PREFERRED EMBODIMENTS

Figure 1:
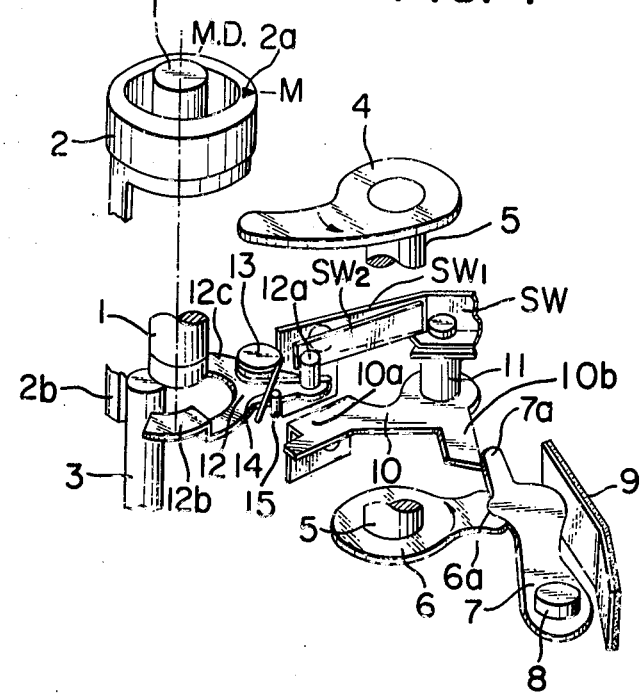
FIG. 1 is a perspective view of an embodiment of the present invention.

Referring to FIG. 1, a shutter button 1 is surrounded by a change-over ring 2 displaceable to respective motor drive photography position and to normal photography position. Within the camera body a release shaft 3 is operatively associated with the shutter button 1, as well known in the art. Also, as known in the art, an advance lever 4 having a retracted position and a drawn-out position is mounted on a rotary shaft 5 which is positioned within the camera body, and an advance claw 6 having a click groove 6a at the end thereof is secured to the rotary shaft 5. A click lever 7 is normally biased counter-clockwise about a shaft 8 by a click spring 9 and is urged against the advance claw 6. A switch lever 10 having an insulation portion 10a engageable with one contact SW1 of the switch SW of the motor driven device is pivotable about a shaft 11. The switch lever has one end 10b engageable with the click lever 7.

The switch SW is supported in open position on the shaft 11. A change-over lever 12 biased clockwise about a shaft 13 by a spring 14 comprises a portion having an insulating pin 12a engageable with another contact SW2 of said switch, a portion 12b engageable with the projection 2b of the change-over ring, and a portion 12c capable of coming beneath the shutter button 1. The change-over lever 12 and the change-over ring 2 together constitute change-over means. A pin 15 serves as an abutment for one end of the torsion spring 14 and also to limit the pivotal movement of the change-over lever 12. The opposite end of the spring bears against the insulating pin 12a.

Figure 2A:
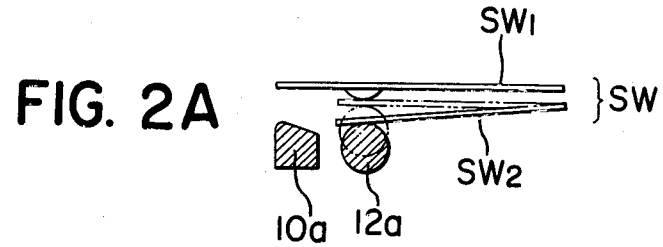
FIGS. 2(a) and 2(b) illustrate the manner in which a switch SW is opened and closed.
Figure 2B:
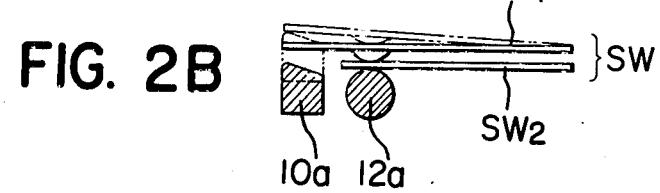

FIG. 2 illustrates the opening-closing of the switch SW. In FIGS. 1 and 2(a), solid lines indicate the normal photography mode during which the advance lever 4 is in its retracted position and the switch SW open. When the change-over ring 2 is rotated counter-clockwise from this position to register the index mark 2a thereof to an indicia M.D., the projection 2b of the ring engages and rotates the change-over lever 12 counter-clockwise against the bias of the spring 14. Accordingly, the insulating pin 12a forces the contact SW2 into engagement with the other contact SW1, as indicated by dots-and-dash lines in FIG. 2(a), to close the circuit and start the motor drive. Such condition is shown in solid lines in FIG. 2(b). At the same time, the portion 12c of the change-over lever has been moved beneath the shutter button 1 to prevent further depression of the button.

Next, as the advance lever 4 is rotated counter-clockwise from its retracted position to its drawn-out position, the advance claw 6 is rotated counter-clockwise to cause the click lever 7 to move out of the click groove 6a. Thus, the click lever 7 is rotated counter-clockwise by the bias of the click spring 9 so that the end 7a of the lever causes the switch lever 10 to be rotated clockwise. Accordingly, the insulating portion 10a forces the contact SW1 out of engagement with the other contact SW2, as indicated by dots-and-dash lines in FIG. 2(b), whereby the motor drive is stopped.

In the described and preferred embodiment, the change-over means and the switch control means are used together to effect closing-opening of the switch. While not as desirable, it is possible to effect closing-opening of the switch by the use of the switch control means only operatively associated with the advance lever. In such case, the switch is closed for the retracted position of the advance lever and opened for the drawn-out position of the advance lever.

Further, it is contemplated that a lever as switch control means be provided on the shaft 5 of the advance lever 4 and used directly to open and close the switch SW or the change-over ring 2 be directly used to open and close the switch SW, thereby omitting the change-over lever 12 as a change-over means.

As hereinbefore described, the switch of the motor driven device is closed only for the retracted position of the advance lever and the motor driven device does not operate when the advance lever is in its drawn-out position. Therefore, the film or the shutter is never motor-driven when they are being wound, and conversely, if the advance lever is drawn out when the motor drive is taking place, the switch is immediately opened to thereby prevent manual advance and automatic advance from taking place simultaneously. Further, when the advance lever is in its drawn-out position, motor drive does not occur, thereby preventing idling of the motor.

Also, even when the advance lever is in its retracted position, motor drive does not occur unless the change-over means is brought to the motor drive photography position, and thus any inadvertent motor drive due to the retraction of the advance lever is prevented.

I claim:

1. A switch mechanism for a motor driven device in a camera provided with the motor driven device for winding a film by an advance lever, said switch mechanism comprising:
   a switch for effecting ON-OFF operation of said motor driven device, said switch having a pair of switch contact members; and
   switch control means operatively associated with the advance lever to control operation of said switch, said switch control means assuming different positions respectively for the retracted position and the drawn-out position of the advance lever, and said switch control means being engageable with one of said switch contact members;
   said switch and said switch control means being arranged so that the switch is closed for the retracted position of the advance lever and opened for the drawn-out position of the advance lever.

2. A switch mechanism for a motor driven device in a camera provided with the motor driven device for winding a film by an advance lever, said switch mechanism comprising:
   a switch for effecting ON-OFF operation of said motor driven device, said switch having a pair of switch contact members;
   switch control means operatively associated with the advance lever to control operation of said switch, said switch control means assuming different positions respectively for the retracted position and the drawn-out position of the advance lever, and said switch control means being engageable with a first one of said switch contact members;
   change-over means operable for displacement to respective normal photography position and to motor drive photography position, and said change-over means being engageable with the other of said switch contact members;
   said switch and said switch control means being arranged so that when the advance lever is in its drawn-out position, the switch control means operates said first switch contact member to open the switch and that when the advance lever is in its retracted position, the change-over means operates said other switch contact member to close the switch in the motor drive photography position and to open the switch in the normal photography position.

3. A switch mechanism according to claim 2, wherein the change-over means comprises a change-over ring and a spring biased change-over lever having means engageable with said switch and means engageable with the change-over ring.

* * * * *